(12) United States Patent
LaFauci et al.

(10) Patent No.: US 6,829,731 B1
(45) Date of Patent: Dec. 7, 2004

(54) METHOD AND SYSTEM FOR GENERATING A DESIGN-SPECIFIC TEST CASE FROM A GENERALIZED SET OF BUS TRANSACTIONS

(75) Inventors: Peter Dean LaFauci, Holly Springs, NC (US); Rhonda Gurganious Mitchell, Fuquay-Varina, NC (US); Jeffrey Richard Summers, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 09/638,757

(22) Filed: Aug. 14, 2000

(51) Int. Cl.$^7$ ................................................ G05F 11/00
(52) U.S. Cl. ............................ 714/33; 714/43; 714/38
(58) Field of Search ........................... 714/47, 38, 33, 714/43, 44, 741; 702/122, 123; 717/115, 124

(56) References Cited

U.S. PATENT DOCUMENTS

| | | | |
|---|---|---|---|
| 5,218,605 A | 6/1993 | Low et al. ................ | 371/16.1 |
| 5,414,836 A | 5/1995 | Baer et al. ................ | 395/575 |
| 5,850,512 A * | 12/1998 | Song ........................ | 714/43 |
| 5,861,882 A | 1/1999 | Sprenger et al. .......... | 345/326 |
| 5,872,797 A | 2/1999 | Theodoseau ............... | 371/27.1 |
| 5,999,180 A | 12/1999 | Coskrey, IV .............. | 345/352 |
| 6,002,868 A * | 12/1999 | Jenkins et al. ............ | 717/105 |
| 6,154,801 A * | 11/2000 | Lowe et al. ............... | 710/119 |
| 6,243,835 B1 * | 6/2001 | Enokido et al. ........... | 714/38 |
| 6,269,467 B1 * | 7/2001 | Chang et al. .............. | 716/1 |
| 6,457,152 B1 * | 9/2002 | Paley et al. ............... | 714/738 |
| 6,463,552 B1 * | 10/2002 | Jibbe ........................ | 714/33 |
| 6,480,801 B2 * | 11/2002 | Chew ....................... | 702/122 |
| 6,502,212 B1 * | 12/2002 | Coyle et al. .............. | 714/43 |
| 6,530,043 B1 * | 3/2003 | Beardsley et al. ........ | 714/52 |

\* cited by examiner

*Primary Examiner*—Robert Beausoliel
*Assistant Examiner*—Yolanda L Wilson
(74) *Attorney, Agent, or Firm*—Joscelyn G. Cockburn; William E. Curry

(57) ABSTRACT

A method and system for automating the creation of test cases for logic designs. A comprehensive set of bus transactions characterizing a bus architecture is provided to a test case designer in a user interface. The designer may enter inputs corresponding to a particular design-under-test (DUT) via the interface. The interface processes the inputs to automatically generate a configuration file corresponding to the particular DUT. The configuration file may be processed by a generator program to automatically generate a test case comprising one or more bus transactions customized to the particular DUT.

5 Claims, 5 Drawing Sheets

METHOD AND SYSTEM FOR GENERATING A DESIGN-SPECIFIC TEST CASE FROM A GENERALIZED SET OF BUS TRANSACTIONS

CROSS REFERENCE TO RELATED APPLICATIONS

This application is related by common inventorship and subject matter to co-pending applications titled "method and System for Measuring and Reporting Test Coverage of Logic Designs" and "Method and System for Efficiently Generating Parameterized Bus Transactions". Until such time as the foregoing applications are assigned application numbers by the U.S. Patent and Trademark Office, they may be respectively referenced by the following applicant Ser. Nos.: 09/638,528 and 09/638,268. The listed applications are assigned to International Business Machines Corporation and are entirely incorporated herein by this reference.

BACKGROUND OF THE INVENTION

The present invention relates generally to the testing of logic designs, and more particularly to a method and system for generating a test case specific to a particular design-under-test (DUT) from a generalized or comprehensive set of bus transactions characterizing a bus architecture.

A process known as verification comprises applying test cases to a DUT and checking the results against expected results to determine whether the DUT functions correctly. Functional verification of logic designs which interface to standardized buses typically involves the use of a software tool known as a bus functional model (BFM). A BFM emulates a bus protocol to apply a test case in simulation to a DUT modeled by a hardware description language (HDL).

The BFMs allow verification engineers to write test cases as bus transactions. The bus transactions may be expressed in bus functional language (BFL) statements which are decoded and executed by the BFMs using a logic simulator. For example, a standardized BFM transaction test case for a 32 bit data slave design that uses read and write transactions with address, data, and control signal information could comprise BFL statements appearing as follows (comments indicated by "//"):

| | |
|---|---|
| read(address=F0,be=1111,data=00000034) | //4 byte read transaction from addr F0; <br> // byte enable (be) indicates <br> // that bytes 0–3 are enabled; <br> // expected data value is 00000034; |
| write(address=F0,be=1000, data=12000000) | // 1 byte write transaction to addr. F0; <br> // byte enable indicates that byte 0 <br> // is enabled, and bytes 1–3 <br> // are not enabled; <br> // 1 byte write data is 12; |
| read(address=F0,be=1111,data=12000034) | // 4 byte read transaction from <br> // address F0; <br> // byte enable indicates that bytes 0–3 <br> // are enabled; <br> // expected data value is 12000034; |

In the foregoing example, read and write are two different transaction types, while address, byte enable, and data are parameters of the respective transaction types. The parameters were used to specify data to be written to an address, and to subsequently read the address to determine whether the data was correctly written.

In order to verify that a DUT completely complies with a standardized bus interface, all possible bus transactions must be performed to ensure that the DUT-to-bus interface operates under all legal bus conditions. This process, also known as regression testing, entails the enumeration of all possible and legal transaction combinations to ensure a complete and correct design.

Typically, test cases for applying all the possible and legal transactions for a DUT-to-bus interface must be specified manually, as BFL statements as shown in the above example. To code the BFL statements, a verification engineer must usually consult a bus architecture specification manual. As the complexity of logic designs increases, the number of transactions which must be applied to a design to fully test it for bus compliance becomes unmanageable by a manual procedure. The procedure becomes unduly time-consuming, and the likelihood that coding errors occur or that needed test cases are omitted increases.

In view of the foregoing, a method and system for efficiently generating test cases is called for.

SUMMARY OF THE INVENTION

In the method and system according to the present invention, a set of transactions characterizing a bus architecture is provided. A subset of the set corresponding to a specific DUT is selected, and a configuration file for verifying the DUT is generated from the selected subset. The configuration file includes rules specific to the DUT, and may be processed by a generator program to generate or enumerate bus transactions, as determined by the rules, for a test case to be applied to the DUT.

In an embodiment, a graphical user interface may be used to create the configuration file. The user interface presents a user with the possible bus transactions of a bus architecture, and allows the user to enter inputs corresponding to a particular DUT. The interface processes the inputs to generate a configuration file syntax used by the generator program. The interface automatically inserts parameter combination specifications and rules into the configuration file for the user.

The advantages offered by the foregoing include greater ease and speed of designing test cases for verification of designs, and avoiding the errors inherent in a manual procedure. A designer of a test case does not need to consult a bus architectural specification, since the set of transactions characterizing the bus is presented in the user interface. A test case may be designed by simply entering a series of inputs relating to a specific DUT via the interface, which then automatically produces the configuration file.

DETAILED DESCRIPTION OF THE INVENTION

Figure 1A:
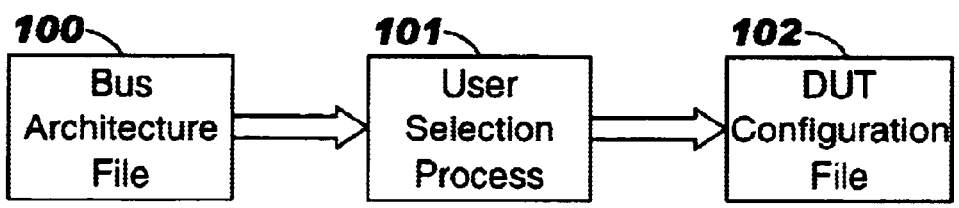
FIGS. 1A–1D are functional block diagrams illustrating an information or processing flow according to the invention.

As shown in FIG. 1A, in the method according to the invention, a bus architecture file 100 is provided. The bus architecture file 100 is processed by a user selection process 101 to select a subset of transactions corresponding to a specific DUT, as defined by transaction types and parameter combinations specified in a DUT configuration file 102.

The bus architecture file 100 comprises a comprehensive set of bus transactions characterizing a bus architecture; i.e., the complete set of transactions executable by a particular bus design, such as a processor local bus (PLB) in a PowerPC® embedded processor architecture. By the user selection process 101, the comprehensive set of bus transactions of the bus architecture file 100 are customized or tailored to a specific DUT with which the bus interfaces, typically a smaller subset of the comprehensive set.

Figure 1B:
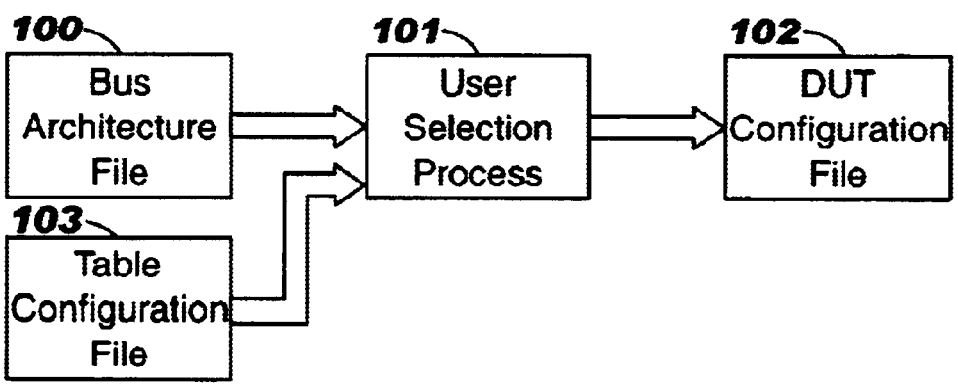

As shown in FIG. 1B, a table configuration file 103 may also be input to the user selection process 101. The table configuration file comprises table entries corresponding to the bus architecture. The user selection process may be implemented with a graphical user interface which presents a user with a set of possible selections based on the bus architecture file and the table configuration file. The user makes selections related to a specific DUT to produce a DUT configuration file 102.

Figure 1C:
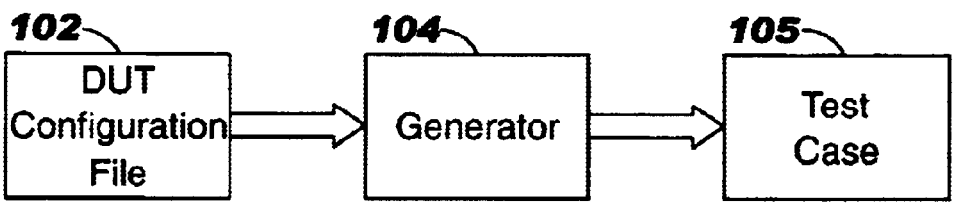

The bus architecture file 100 and DUT configuration file 102 may be expressed in a condensed or compact syntax which allows for a description of the bus transactions of a particular bus architecture or of a DUT to be expressed in an economical form suitable for being expanded or enumerated by a generator program. As shown in FIG. 1C, the DUT configuration file produced by the user selection process may subsequently be processed by the generator program 104 to generate a test case 105 comprising one or more bus transactions, typically expressed in bus functional language, for verification of the DUT. The generator program forms transaction parameter combinations and tests them against rules to determine whether a combination should be included in a test case, as described in more detail hereinafter.

Figure 1D:
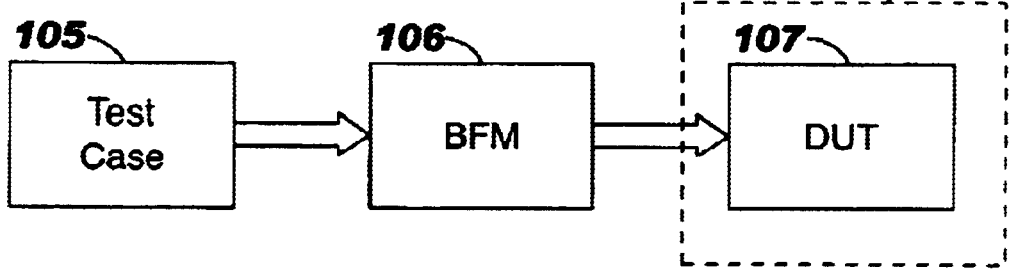

As shown in FIG. 1D, the test case may be applied by a BFM 106 to a DUT 107 being simulated by a logic simulator 108, in order to verify the DUT.

Figure 2:
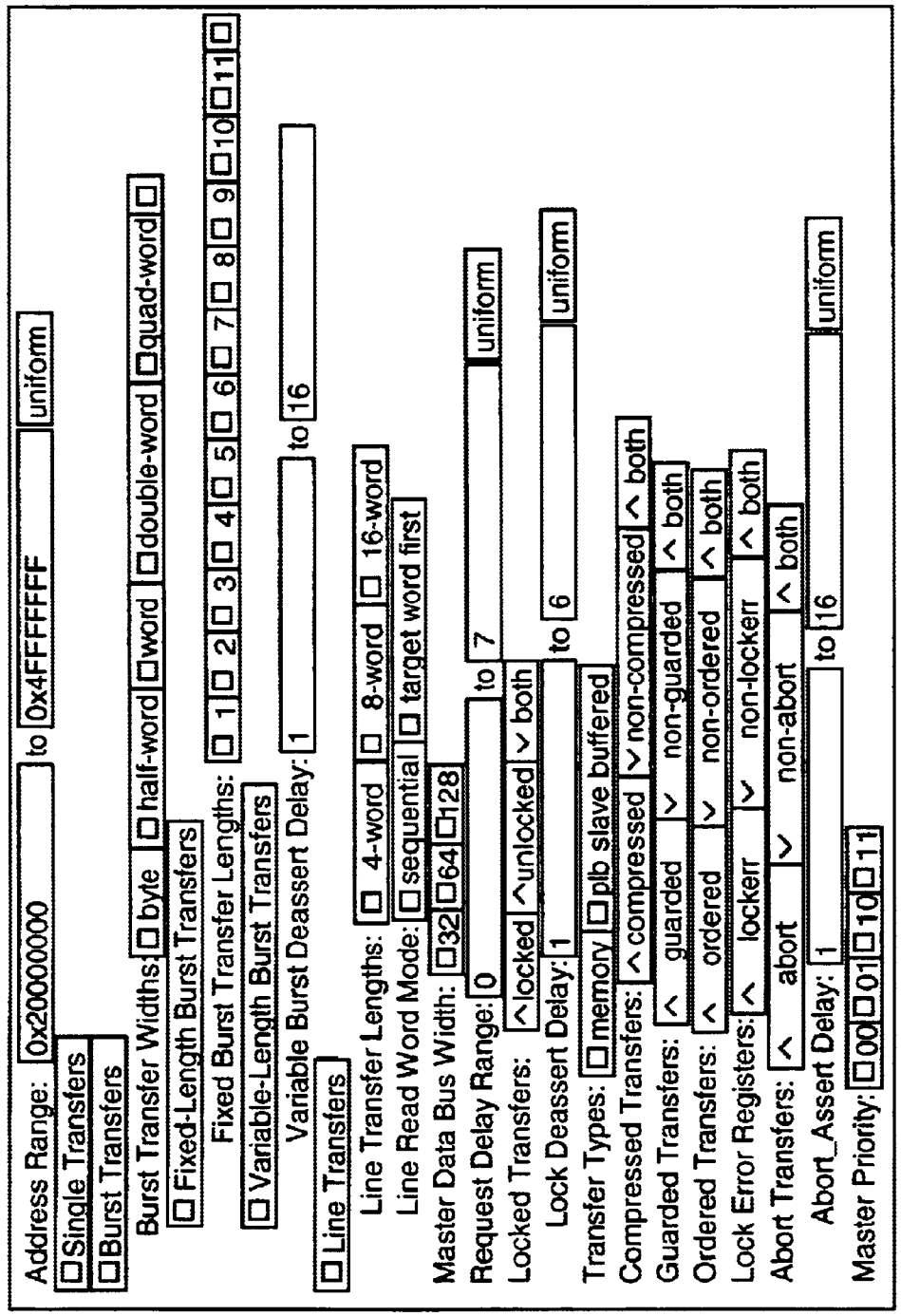
FIG. 2 is an example of a portion of a display of a graphical user interface according to the invention.

As described above, the user selection process may be implemented with a graphical or text-based user interface, which presents a user with a set of possible selections corresponding to a bus architecture file. An example of a portion of a display of such an interface, corresponding to a PLB architecture, is shown in FIG. 2. As seen in the portion of the display shown, the user interface lets the user enter such DUT-specific information as the transfer mode (Single or Burst), transfer width (byte, half-word, word, doubleword, etc.), transfer type (memory, plb slave buffered), and other information.

The interface provides for the automatic generation of the DUT configuration file syntax from the bus architecture file syntax. The syntax includes parameter combination specifications and rules. The parameter combination specifications are used by the generator to systematically generate or enumerate possible bus transactions for output to a test case, and the rules provide for the exclusion of specified parameter combinations from the test case to customize the generated parameter combinations to a particular DUT. The parameterized bus transactions may be used to test compliance of the DUT with the bus architecture.

The bus architecture file 100 and the table configuration file 103 facilitate the implementation of the user interface. The bus architecture file provides such information to the user interface as base rules for the bus, types of possible transactions for the bus (e.g., reads and writes), and other information. The table configuration file provides table entries corresponding to the possible transactions of the bus architecture and may be updated by user selections via the user interface. The updated table entries are used to produce a specific DUT configuration file. The table configuration file also provides information for generating the visual display of the user interface.

Figure 3:
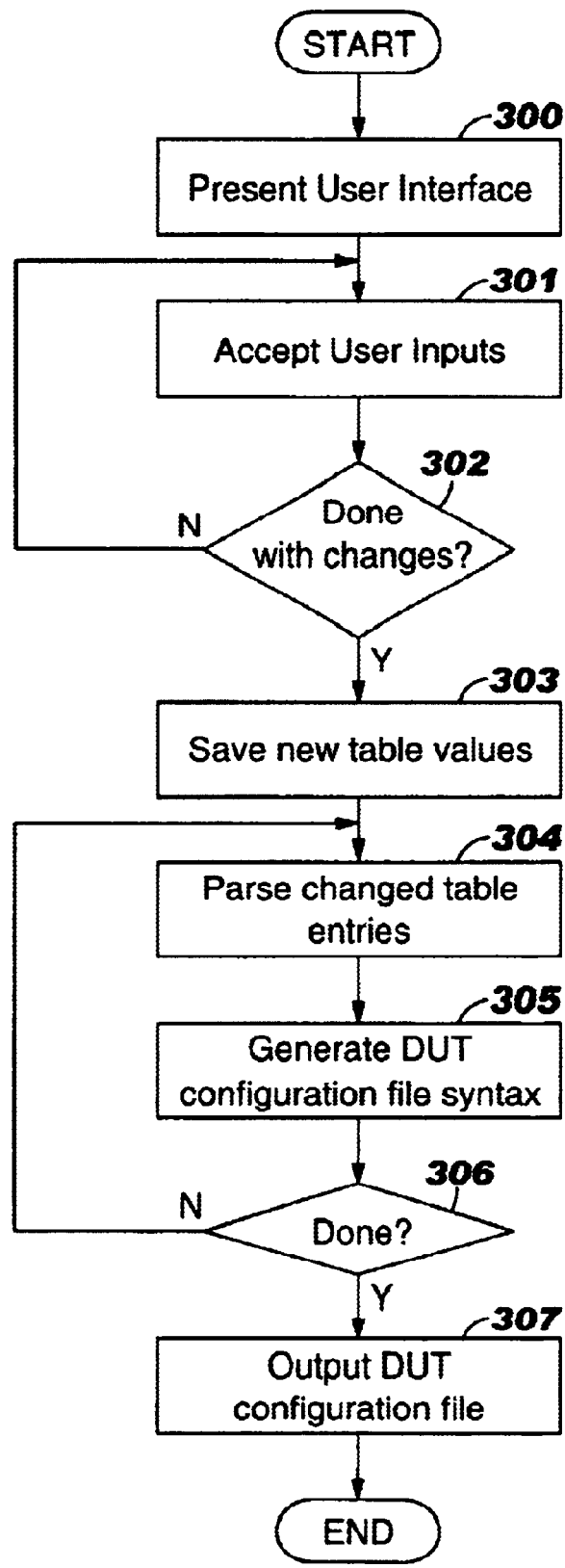
FIG. 3 shows a process flow for making user selections to create a DUT configuration file.

A process flow illustrating the user selection process is shown in FIG. 3. As shown in block 300, a user interface such as shown in FIG. 2 is presented to a user. To generate the visual interface for presentation, each entry of the table configuration file 103 is parsed, parameter values in the table entries are read and the read values are inserted into the display.

Then, as shown in blocks 301 and 302, the user interface accepts user inputs to change table entries, including allowing a user to insert a custom rule or rules if desired. When a user has made all the desired changes to the table entries, the changes are saved as shown in block 303.

Next, as shown in blocks 304 and 305, the user interface parses the changed table entries to generate the DUT configuration file syntax, including generating parameter combination specifications and rules as described above, corresponding to the user inputs. When the interface is finished parsing the table entries and generating the DUT configuration syntax as determined by decision block 306, it outputs the DUT configuration file 102 as shown in block 307. The DUT configuration file may subsequently be processed by a generator as described above to produce a test case comprising one or more bus transactions.

Fields within a table entry of the table configuration file allow for the selection, via the interface, of a particular set of values corresponding to a specific DUT. The interface will convert the selected values into syntactical statements in the syntax described above; elements of the syntax are described in greater detail below. The syntactical statements are then in a form for being processed by the generator to produce a test case.

As an example, a given bus architecture might have a 32-bit address range (x00000000 to xFFFFFFFF), and this would be reflected in an initial address range presented by the user interface. A DUT may be address-mapped and support only a subset of that address range, for example, x00000000 to x8FFFFFF. A user wanting to create a test case for that DUT might want to perform read transactions to addresses x00000000 through x5FFFFFFF, and write transactions to addresses x60000000 through x8FFFFFFF.

Accordingly, via the user interface, the user would alter the address ranges for the respective transactions as desired, and save the changes. The user interface would then execute a routine which would result in syntactical statements reflecting the changes for output to a DUT configuration file. Specifically, in one possible formulation of the configuration file syntax, a parameter combination specification would be created that, when processed by the generator, would enumerate addresses x00000000 to x8FFFFFFF. A rule would be generated that would specify that for reads, only the subset x00000000 to x5FFFFFFF were to be output as transactions, and the rest were to be excluded. For writes, only the subset x60000000 to x8FFFFFFF would be output as transactions.

In simple cases, it could be more efficient to simply limit a range, without generating rules. Typically, however, when a rule involves more than one parameter as in the above example (read, write, and corresponding ranges), a rule or rules are inserted into the syntax rather than a simple reduction of the parameter specification. Rules are more versatile in that they can specify interdependencies of parameters in the rules.

A description of a possible embodiment of the syntax used for the bus architecture file 100 and DUT configuration file 102 follows. Comments are indicated by "l/". It is noted that the form of the syntactical statements described is arbitrary and merely representative of functionality which could be implemented in a wide variety of symbolic formulations suitable for being parsed by a parsing routine.

configuration [name]

This syntactical statement specifies a bus architecture type. Each bus architecture is characterized by a set of transactions, and typically a subset of those transactions constitutes an interface with a given DUT.

path [device_path]

This syntactical statement specifies a logical path in a testing system hierarchy to a device or software entity, such as a BFM, that is used to apply a test case to a DUT.

device_type[name]

This syntactical statement specifies a type of device in a given bus architecture, such as a slave, master or arbiter, used to apply a test case to a DUT.

iterations [integer]

This syntactical statement specifies a maximum number of bus transactions a user wishes the generator to output to an output file. If this statement is not included in the configuration file, then the generator will simply output all possible bus transactions (depending on rule specifications) corresponding to parameter definitions in the configuration file.

file_size [integer]

This syntactical statement specifies a maximum number of bus transactions for the generator to output per file. When the maximum number is reached, the generator creates a new output file and begins outputting to the new output file.

traverse [1 or 0]

This syntactical statement allows a user to direct the generator to continue enumerating bus transactions once a maximum number specified by the iterations statement, for example, has been reached, but without outputting the transactions to an output file.

trans_type
   [command1] [command2] [command3] . . .
end_trans_type

This syntactical statement specifies bus transaction types ("command"). Examples include "read" and "write". The generator will generate bus transactions of the transaction types and including parameter combinations as determined by a command statement, discussed below.

generate
  // specification of a list of transaction types
  list [command1] [command2] [command3] . . .
  // specification of an integer=n, where n is a number of transaction types to be selected at random from the trans_type list
  uniform [integer]
end generate This syntactical statement specifies a way in which bus transaction types are generated by the generator program. In the list format, a user lists transaction types. The generator will generate all the possible combinations of the listed transaction types, along with associated parameters as specified by the command statement described below.

An alternative format for the generate syntactical statement is to specify the keyword uniform followed by an integer. This format will cause the specified integer number of transaction types to be selected at random from the list set forth in the trans_type statement.

passthrough [pregen or postgen] [all or number]
  [Initialization/Termination command1]
  [Initialization/Termination command2]
end passthrough This syntactical statement allows the user to specify initialization or termination commands for being included in a test case. The initialization or termination commands are not processed by the generator, but are instead simply "passed through" directly to the generator output file. The pregen keyword causes initialization commands to be inserted ahead of generated bus transactions, while the postgen keyword causes termination commands to be inserted after generated bus transactions. The parameter all may be specified to have the pregen or postgen commands passed to all test cases, or a particular test case may be specified by number to receive pregen or postgen commands.

command
  //for an enumerated list
  [parameter name] [enum] [item1][item2] [item3] . . .
  // for a range of values, or a uniform random distribution within a range
  [parameter name] [uniform or range] [min_value][max_value] [step][step_value]
  // for type range: step and step_value are optional
end command This syntactical statement allows a user to specify all of the parameters, and all of the possible parameter values for each parameter, that are valid for a given bus architecture.

Following the command identifier are parameter combination specifications. Possible formats for specifying parameter combinations include enum, uniform, and range, as shown. For parameter combination specifications of type enum, the parameter values follow the keyword enum in the form of an enumeration list. As discussed in greater detail below, when the generator processes a parameter combination specification of the enum type, it will combine each of the listed parameter values with other parameter specifications of the command statement using an enumeration routine. Depending upon applied rules, the generator will output the combinations, typically in the form of bus transactions, to an output file.

For parameter combination specifications of type uniform and range, a user specifies minimum (min_value) and maximum (max_value) values following the corresponding keyword. For specifications of type uniform, the generator will choose a random value between the minimum and maximum values when generating parameter combinations.

For specifications of type range, a user may choose a step value or increment between the minimum and maximum values. This is accomplished through the use of the step keyword followed by a value indicating the step value (step_value). When processing parameter combination specifications of type range, the generator sets the parameter to the minimum range value and then increments the value by the specified step value to generate parameter combinations. The step and step value keywords are optional. If step and step_value are not included within the parameter combination specification, then the step_value defaults to 1 and all possible values within the minimum and maximum values are generated.

Different formats may be used for range and uniform specifications, including decimal, binary, and hexadecimal.

To specify a format, special characters may be included before the min_value and max_value keywords. Hexadecimal may be chosen by including an "x" character and binary by including a "b". Preferably, decimal is the default.

Examples: x10 // hexadecimal value, equal to 16 decimal
b10 // binary value, equal to 2 decimal
10 // decimal value rule [include or exclude] [rule_name] // optional rule specifications
    [eq or ne] [parameter name] [item 1] [item2] [item3]
    [lt or gt] [parameter name] [value]
    [eq or ne] [parameter name] [mask] [mask_value] [value] [test_value]
end_rule This syntactical statement allows a user to restrict the total set of bus transactions generated, as defined by the command specifications, to possible subsets for output. Rules may specify the actions exclude or include to exclude or include, respectively, a combination of parameters and parameter values for the bus transactions, based upon the results of tests specified by the user. The tests include different types of relational operators, such as: equal (eq), not equal (ne), less than (lt), or greater than (gt).

In the first format shown above for specifying a test (the line reading [eq or ne] [parameter name] [item 1] [item2] [item3]), each combination of a list item ([item 1], [item2], or [item3]) with [parameter name] is compared to a generated combination using the specified relational operator [eq or ne]. Each test returns a true condition or a false condition.

In the second format shown (the line reading [lt or gt] [parameter name] [value]), [parameter name] is compared with [value] using the specified relational [lt or gt]. Each test returns a true condition or a false condition.

In the third format shown, tests may be specified using a mask format. With the mask format, the value specification is masked with the mask_value specification. The result is then tested against test_value using the appropriate relational operator [eq or ne].

If all the tests specified in a rule return a true condition, then the specified action is performed. That is, if all tests return a true condition and the rule specifies include, the parameter combination is included in the generator output file. If the rule specifies exclude, the parameter combination is not output to the output file.

If any test returns a false condition, then the action opposite to the action specified is performed. That is, if any test returns a false condition and the action specified is include, the parameter combination is excluded from the output file. If the action specified is exclude, the parameter combination is included in the output file.

If more than one rule is stated in a configuration file, a first logical AND operation is performed with the conditions returned by evaluating all the tests specified for exclude actions. A logical OR operation is performed with the conditions returned by evaluating all the tests specified for include actions.

Then, a second logical AND operation is performed with results of the first logical AND and the logical OR operations. The second logical AND operation returns a true or false condition to determine whether to include the parameter combination or combinations for which rules are specified.

If no rules are included in a configuration file, all the parameter combinations corresponding to the command statement specification are generated or enumerated. As described above, the iterations statement may limit the number of transactions output to the output file.

rule [NA] [parameter name] (optional)
    [eq or, ne] [parameter name] [item1] [item2] [item3]
    [lt or gt] [parameter name] [value]
    [eq or ne] [parameter name] [mask] [mask_value] [value] [test_value]
end_rule This syntactical statement allows for the omitting of certain parameters under specific conditions during test case generation. The tests under the NA (Not Applicable) formulation use relational operators as in the include/exclude rules described above.

In order for a parameter to be evaluated as Not Applicable and therefore excluded from the generator output, all the tests specified must return a true condition. If this true condition occurs, the parameter name specified in [parameter name] is excluded from a currently selected list of parameter values generated by the generator. The NA formulation for a rule serves to filter single parameters located within the currently selected list.

end_configuration

This syntactical statement denotes the ending of the configuration file.

Figure 4:
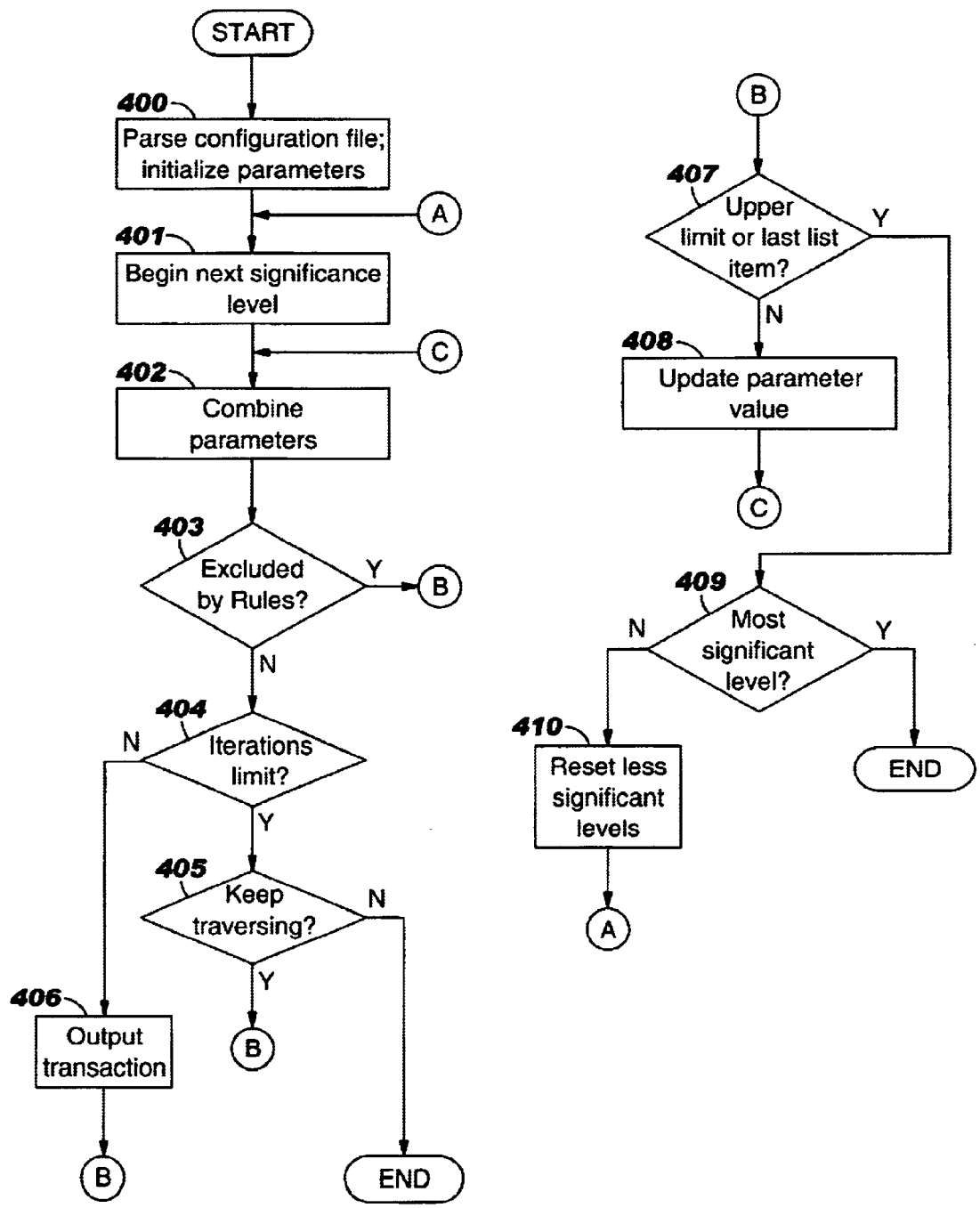
FIG. 4 shows a process flow for a generator routine that generates bus transactions.

FIG. 4 shows a process flow for the generator 104, given a configuration file 102 specified in the above-described syntax as input. As shown in block 400, initially the generator parses the configuration file and initializes parameter values. All range specifications are set to their respective lower limits, or min values, and all enumeration lists are set to their first listed item.

In order to systematically enumerate each possible parameter combination, the generator assigns a significance level to each parameter combination specification in a command statement, based on its place in a sequence within the command statement. In an embodiment, the parameter combination specification last in the sequence is the least significant, the next-to-last parameter combination specification is next-to-least significant, and so on up to the first or most significant specification in the sequence.

As shown in block 401, enumeration or generation of parameter combinations begins with the level of least significance (initially the "next" significance level is the least significant level). As shown in block 402, the generator combines parameter values at each significance level, at their current state, to form a parameter combination.

As each parameter combination in the command statement is generated, it is checked against any rules which may be defined in the configuration file, as shown in block 403. If the generated parameter combination is not excluded by a rule, the generator checks for whether an iterations limit as specified in an iterations statement as described above has been reached, as shown in block 404. If the combination is excluded by a rule, the flow proceeds to block 407.

If an iterations limit has been reached, as shown in block 405 the generator checks for whether to keep traversing the command structure to form parameter combinations, but without outputting them, as specified in the traverse statement described above. If traverse has not been set to "1", the generator stops. Otherwise, the flow proceeds to block 407.

If an iterations limit has not been reached, the parameter combination is output to an output file, typically in the form of a bus transaction, as shown in block 406.

At block 407, the generator checks for whether an upper limit of a specified range has been reached within the current significance level. In the case of an enumeration list, the generator checks for whether all items of the list have been visited or traversed.

As shown in block 408, if within the current significance level the upper limit of a range has not been reached or all the items of an enumeration list have not been traversed, the parameter value of the range is updated (by step value if specified or by 1 if not) or the next list item is fetched or visited. Then, the resulting parameter combination is checked against the rules, if any.

When the upper limit of a range is reached or all list items of an enumeration list have been traversed, the generator moves up to the next significance level. As shown in block 409, if all significance levels have been processed, the generator is finished and exits. If not, as shown in block 410 the generator resets all levels of lesser significance than the next level to be processed to their initial values, i.e., to the lower limit of a range or to the first item in an enumeration list, and processes the next level.

It may be observed that the foregoing resembles the functioning of a mileage odometer, in that digits of an odometer, corresponding to significance levels in the above, run through all possible values, beginning with the least significant digit.

The following is an illustrative example of the foregoing enumeration process:
command
    address range x0A x0C
// The above is a command statement in the configuration file syntax. The first and // most significant parameter combination specification is a range type of // specification for parameter name=address. The lower limit or min_value for the // range is x0A, and the upper limit or max_value is x0C. No step value is specified, // so beginning with the lower limit, the range will be incremented by the default step // value which is 1;
    be enum 000 111
// The above is an enum or enumeration list type of parameter combination
// specification for parameter name=be (byte enable) comprising two list items, 000 // and 111. This is the least significant parameter combination specification in the // command statement;
end_command From the above command specification, the generator would produce the following parameter combinations:
    address=0A, be=000
    address=0A, be=111
    address=0B, be=000
    address=0B, be=111
    address=0C, be=000
    address=0C, be=111

As can be seen, the generator traversed the least significant level first, pairing each list value with the initial range value, 0A, of the next significance level. Then, the next significance level was processed. The range value was incremented to 0B, the level of lower significance was reset to its initial value, and the generator produced the next possible combinations. Finally, the upper limit, 0C, of the most significant level was reached and each combination at that level was generated.

The following is an example of application of a rule in a configuration file to the above-described command definition:
rule exclude
    eq address x0C
    eq be 111
end_rule In the above rule specification, the specified tests are that if a parameter combination having an address equal (eq) to x0C and a "be" parameter equal to 111 is generated, the combination is to be excluded from the generator output. Thus, if this rule was present in the configuration file with the above command definition, the generator would produce the following output:
    address=0A, be=000
    address=0A, be=111
    address=0B, be=000
    address=0B, be=111
    address=0C, be=000

It can be seen that, because both tests returned a true condition for the parameter combination "address=0C, be=111", this combination was excluded from the generator output.

The following is another example of a configuration file and resulting generator output:

---

Configuration file:

configuration plb_device
// The bus is a plb processor local bus);
path /plb_complex/m0/master
device_type plb_master
// Path and device type specifications;
trans_type
    read write
end-trans_type
// Transaction types are "read" and "write";
generate
    list write
end_generate
// This generate statement will cause the generator to produce write transactions. If
// uniform[integer] were specified instead, the generator would randomly select
// transaction types from the trans_type specification;
passthrough pregen
    wait (level=0)
end_passthrough
// Passthrough statement;
command
    address range x0001 EEE0 x0001 EEE8
    be enum 000 111
end_command
// Command statement with two parameter combination specifications. The most
// significant is a range type with a lower limit of x0001 EEE0 and an upper limit of
// x0001 EEE8; the least significant is an enumeration list with 000 as the first list
// item and 111 as the last list item;
passthrough postgen
    send (level=1)
end_passthrough
// Passthrough statement;
rule exclude
    gt address x0001 EEE0
end_rule
// This rule will exclude all generated address parameters having a value greater than
// x0001 EEE0;
end_configuration

---

Generator output (bus transactions in bus functional language):

set_device (path=/plb_complex/m0/master, device_typep=plb_master)
// Device and path definitions;
    wait (level=0)
    write(address=0011EEE0, be=000)
    send (level=1)

-continued

```
// From the specification of the generate statement, the generator
produced a "write"
// bus transaction. At the least significant level of parameter combination
// enumeration, with be=000, all address parameter values for the write
// transaction greater than x0001 EEE0 were excluded by the rule. The
// passthrough statements caused their respective commands to be
inserted before and
// after the write transaction;
    set_device (path=/plb_complex/m0/master, device_type=plb_master)
// Device and path definitions;
    wait (level=0)
    write(address=0001EEE0, be=111)
send (level=1)
// At the least significant level of parameter combination enumeration,
with be=111,
// all address parameter values for the write transaction greater
than x0001 EEE0
// were excluded by the rule. The passthrough statements caused
their respective
// commands to be inserted before and after the write transaction;
```

As noted above, the foregoing syntax may be used for the bus architecture file 100 and the DUT configuration file 102. More particularly, the user selection process 101 tailors or customizes the syntax of the bus architecture file 100 to the syntax of the DUT configuration file 102.

In order to describe a possible embodiment of the invention for implementing the user selection process 101 described above, an example of a generic table entry of the table configuration file 103 is shown below. Elements of the table entry are represented as generic variable names (e.g., "type_possible") which may assume specific values assigned by a user or by software implementing the user interface based on information provided in the input bus architecture and table configuration files. The user interface parses assigned values in the table entry to produce a DUT configuration file.

```
1       table_type name_of_entry table_level
2           type_off type name_of_entry type_value
3           type_label title_of_entry
4           type_possible possible_values
5           type_value value
6           type_type type_value
7           type_step step_value
8           cmd_attr value
9               . . .
10              rule function
11              . . .
12              end_rule
13          end_cmd_attr
14      end_type
```

Line 1 of the above generic table entry would be used to specify a table entry type, for example, "range", "enum" or the like, which would typically correspond to a format of the command statement in the configuration file syntax. A table entry type might also be "select" or "active". A "select" type of table entry provides for a single value of a group of possible values to be assigned to an entry variable, as opposed to, for example, an "enum" type which allows multiple values to be assigned. An "active" entry type provides status information on the entry to the interface. A name of the table entry could also be included in line 1. Line 1 further provides for the specification of a level of the entry in a table hierarchy. Entries lower in the hierarchy are dependent on entries higher in the hierarchy. When table_level is not specified or is "0", the entry is independent.

Line 2 of the generic table entry would have values associated with it that are used by the interface to determine whether an entry is "active" or not. An entry that depends on a higher-level entry is inactive when the higher-level entry is inactive. When the interface parses updated table entries to produce the DUT configuration file, this information tells the interface whether or not to process dependent entries; "type value" may be "yes" or "no" to specify whether or not a table entry is active;

Line 3 provides for an arbitrary label for the entry;

Line 4 provides a selection of possible parameter values to the user.

Line 5 contains the user-specified subset of the possible values.

Lines 6 and 7 allow for a mode of range enumeration to be specified, for example, uniform or step, and a step value to be specified if the mode selected is step.

Lines 9 through 12, delimited by "cmd_attr" on line 8 and "end_cmd_attr" on line 13, would be included in a command specification in the DUT configuration file, with "value" taking on values assigned by user and held in the "type_value" field; rules for insertion into the DUT configuration file are also delimited by "cmd_attr" and "end_cmd_attr".

Line 14 denotes the end of the table entry.

Below is a first example of a table entry in which the generic variable names described above have been evaluated or assigned specific values from information in the bus architecture and table configuration files, but before a user has changed or updated the entry:

EXAMPLE 1

```
table_range address
// "type" is "range"; "name_of entry" is "address";
    range_label "Address Range(hexadecimal)"
// "title_of_entry" is "Address Range(hexadecimal)"
    range_value x00000000 xFFFFFFFF
// "type" is "range" , so "value" is specified as a range, in this case
the default range of the
// bus architecture;
    range_type step
    range_step 1
    cmd_attr
        addr range value_0 value_1
// This portion of the table entry corresponds to an actual command
// specification; "value_0 value_1" would have the values
"x00000000 xFFFFFFFF"
// specified in the "range value" line above, assuming no user override;
    end_cmd_attr
end_range
```

As described above, the foregoing table entries may be updated by a user via the user interface. For instance, if a user changes the address range in the Example 1 entry above to x00000000 through x11111111, then the first entry will be updated to the following:

```
table_range address
    range_label "Address Range(hexadecimal)"
    range_value x00000000 x11111111
    range_type step
    range_step 1
    cmd_attr
        addr range value_0 value_1
    end_cmd_attr
end_range
```

It should be noted that the upper address value in the range_value field has been changed.

Below is a second example showing two table entries, with the second table entry dependent on the first. The generic variable names described above have been evaluated or assigned specific values from information in the bus architecture and table configuration files, but before a user has updated the entry. Note that, depending on the type of table entry, certain fields of the generic entry discussed above are unnecessary. The first entry shown below, for example, is a zero-level entry and thus requires no "type_off" field:

EXAMPLE 2

```
table_active single_xfer
// "type" is "active" ; the name of the table entry is "single_xfer;
   active_label "Single Transfers"
   active_value yes
// Since "active_value" is initially assigned a value of "yes", table entries dependent on
// this table entry will be parsed by the interface. A user may change "active_value" to
// "no" , which would tell the interface to bypass dependent entries;
   cmd_attr yes
      size enum 0000
      rule include
         eq trans_type read
         eq size 0000
      end_rule
   end_cmd_attr
   cmd_attr no
      be range b0000 b0000
   end_cmd_attr
end_active
table_range single 1
// Since table_level is 1, this entry is dependent on the previous entry;
   range_off active single_xfer no
// Specifies that if active_value for the previous entry (single_xfer) is "no", this entry is
// not to be parsed;
   range_label "Single Byte Enable Range (binary)"
   range_value b0000 b1111
   range_type Step 1
   cmd_attr
      be range value value_low value_high
// Absent user override via the type_type field, value_low will be assigned b0000 and
// value high will be assigned b1111 from the range_value field;
      rule include
         eq trans_type read
         eq size 0000
         eq be range value_low value_high
      end_rule
   end_cmd_attr
end_range
```

As in Example 1, values in the above table entries could changed by user inputs. For example, "active_value" in the "table_active single_xfer" entry first in the hierarchy could be changed from "yes" to "no", causing the interface to skip the dependent entry, "table_range single 1", when parsing the entries to produce a DUT configuration file. Or, for example, a user could change the upper range of "range_value" to "b0011", which would cause "value high" in the "cmd_attr" sections to have the value b0011.

When the user has made changes to table entries as described above, and saves or registers the changes via the user interface software, the changed entries are used to determine the values that are placed in the command section of the DUT configuration file. In addition, the changed values in the entries are used to determine which rules will be placed in the DUT configuration file. This is done by comparing the user selections to values in the "cmd_attr" field, and then including the rules that follow accordingly.

Cmd_attr fields corresponding to user selections will be parsed to include the parameter combination specifications in the command section of the configuration file, while "exclude" rules for these parameter combinations will not be included. In contrast, non-selected cmd_attr fields will be parsed to insert "exclude" rules for corresponding parameter combinations in the command section.

A third example, describing user selections and the corresponding generation of rules in two table entries, is shown below. The two table entries are named "burst_xfer" and "burst_width", respectively; the "burst_width" entry is dependent on the "burst_xfer" entry.

EXAMPLE 3

```
table_active burst_xfer
// "type" is "active"; "name_of_entry" is "burst_xfer";
   active _label "Burst Transfers"
// "label" is "Burst Transfers";
   active_value yes
// Because "active_value" is "yes", dependent table entries will be parsed by the user
// interface;
   cmd_attr yes
      be enum 0000
   end_cmd_attr
end_active
table_enum burst_width 1
// "type" is "enum"; "name_of entry" is "burst_width";
"table_level" is 1, and
// consequently this table entry is dependent on the preceding entry;
   enum_off active burst_xfer no
   enum_label "Burst Transfer Widths"
   enum_possible byte half-word word
// Possible values for burst transfer modes are "byte", "half-word" and "word";
   enum_value half-word word
// The user has specified "half-word" and "word" modes for burst transfers,
and omitted
// "byte" ; accordingly, because "byte" is not a user-selected value, when the interface
// parses the following cmd_attr section, the "exclude" rule will be inserted in the DUT
// configuration file;
   cmd_attr byte
      size enum 1000
      rule exclude
         eq trans_type read
         eq size 1000
      end_rule
   end_cmd_attr
// As noted above, the user has selected "half-word" and "word" modes;
// accordingly, when the user interface parses the following cmd_attr section, "size
// enum 1001" will be inserted in a command specification in the DUT configuration file,
// but the "exclude" rule will not;
   cmd_attr half-word
      size enum 1001
      rule exclude
         eq trans_type read
         eq size 1001
      end_rule
   end_cmd_attr
// Because "word" was user-selected, when the user interface parses the following
// cmd_attr section, "size enum 1010" will be inserted in a command specification in the
// DUT configuration file, but the "exclude" rule will not;
   cmd_attr word
      size enum 1010
      rule exclude
         eq trans_type read
         eq size 1010
      end_rule
```

```
  end_cmd_attr
end_enum
```

Shown below is pseudo-code describing a routine executed by the user interface to parse user inputs and produce command and rule specifications for the DUT configuration file. Generally, the routine traverses the table entry hierarchy to find active entries. For active entries within each level of the hierarchy, the routine reads values set in the table entry and holds them in a list to be used to build the command and rule specifications. In building the command and rule specifications, the routine parses the cmd_attr section of the table entry and appends rules with associated parameters.

```
begin bfg_generate { } {
foreach transaction type {
open input file
open output file
while { not end of file } {
#search for keyword table
if { "table" }
   set the sub_table level
   store the type and name of the table section
   # types include range, enum, select, and active
   while { not end of entry }
      if { type_value is found }
         if {entry type = "range"}
            read in the low and high values
         elseif { entry type = "active" }
            set active_#
         elseif { entry type = "enum" }
            set enwn_value_list
         else
            set select_value
      elseif { "range_type" }
         set range_type
      elseif { "range_step"}
         set range_step
   elseif { type_off }
      #read in the off value(s) depending on the sub_table level
      set off_compare_type
      if { off_compare_type = "select" }
         set variable to hold select_value
      elseif { off_compare_type =0 "active" }
         set variables to hold active values
      if { first sub_table level }
         check to see if the above level is off and if it is then skip the entry
         otherwise continue
      elseif { second sub_table level}
         check to see if any of the above levels are off and if they are
         then skip the entry
         otherwise continue
      elseif { third sub_table level } {
         check to see if any of the above levels are off and if they are
         then skip the entry
         otherwise continue
         # The following section is where the parameters and
their corresponding values
         # are used to form the command list for the DUT configuration file
         # This sections also adds the appropriate rules to the rules list
         elseif { cmd_attr }
            if { entry type = "range"}
               if { the parameter has a command list entry }
                  find the highest and lowest range values entered for
                  the current parameter
                  while { not end_cmd_attr} {
                     if { " rule exclude" or "rule include" }
                        append the rule(s) to the rules list
                     elseif { command list entry }
                        if {parameter exists} {
                           append values to end of command list
```

```
                           for the parameter
                        else
                           create a command list for the parameter
                           append the values for the parameter
                     }
                  elseif { entry type = "enum"}
                     #compare the cmd_attr value with the chosen enum values
                     if {enum_value = cmd_attr value }
                     # enum match
                     while { not end_cmd_attr} {
                        if { "rule exclude" }
                           skip over the rule(s)
                        elseif { "rule include" }
                           append the rule(s) to the rules list
                           # add the parameter to the command set
                     elseif { command list entry }
                        if {parameter exists}
                           append values to end of command list for the parameter
                        else
                           create a command list for the parameter
                           append the values for the parameter
                  }
                  else
                  #not an enum match
                  while { not end_cmd_attr } {
                     if {" rule exclude" }
                        append the rule(s) to the rules list
                     elseif { command list entry }
                        if {parameter exists}
                           append values to end of command list for the parameter
                        else
                           create a command list for the parameter
                           append the values for the parameter
                  }
               elseif { entry type = "active"}
                  # add the rule based on the active value and cmd_attr value
                  if { active_value = cmd_attr value }
                     while } not end_cmd_attr} {
                        if { "rule" }
                           # read in the rules that are associated with this attribute
                           append the rule(s) to the rules list
                        elseif { command list entry }
                           if {parameter exists}
                              append values to end of command list for the parameter
                           else
                              create a command list for the parameter
                              append the values for the parameter
                     }
                  else
                     skip cmd_attr entry
               elseif { entry type = "select"}
                  if { select_value = cmd_attr value}
                     while { not end_cmd_attr } {
                        # add the rule based on the user selected values
                        if { "rule exclude" }
                           skip over the rule(s)
                        elseif { "rule include" }
                           append the rule(s) to the rules list
                        elseif { command list entry }
                           # add the parameter to the command set
based on user selection
                           if {parameter exists}
                              append values to end of command list for the parameter
                           else
                              create a command list for the parameter
                              append the values for the parameter
                     }
                  else
                     skip cmd_attr entry
}
#end while
}
#foreach ttype
}
#end bfg_generate
```

Figure 5:
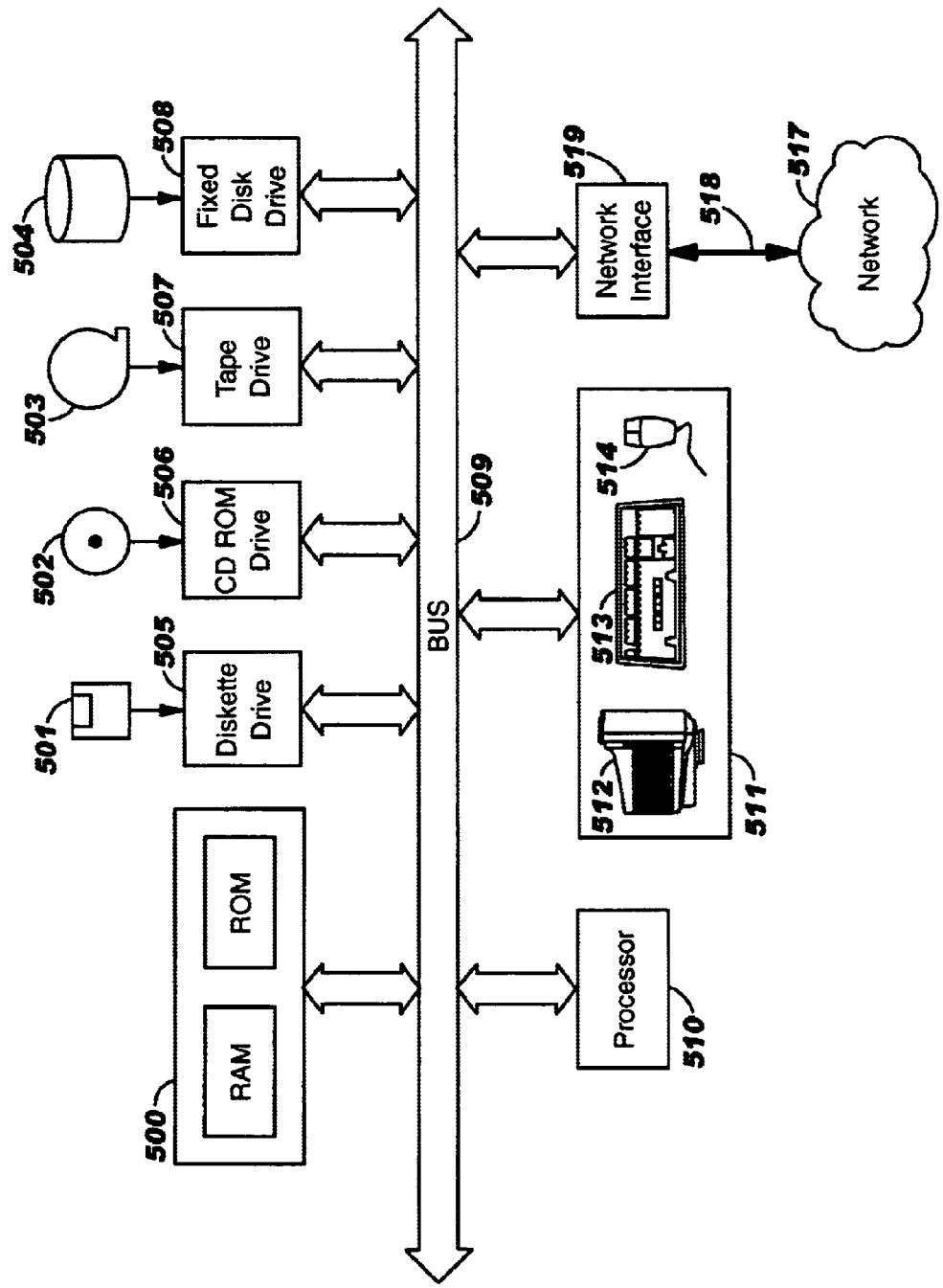
FIG. 5 shows a computer system for practicing the invention.

FIG. 5 shows a high-level representation of a computer system for implementing a preferred embodiment of the present invention, such as might be realized by a variety of known and commercially available hardware and software elements as embodied in, for example, a UNIX® workstation. The system comprises a memory 500 including ROM and RAM, processor 510 and user interface 511 comprising a video display 512, keyboard 513 and mouse 514. Elements may communicate via system bus 509. The system may further comprise a network 517 connected by a network medium 518 and network interface 519.

A computer program or collection of programs comprising computer-executable instructions for performing method steps according to the present invention may be stored and transported on computer-usable media such as diskette 501, CD-ROM 502, magnetic tape 503 and fixed disk 504. To perform the steps of the method, computer instructions according to the present invention may be retrieved from the computer-usable media 501–504 using their respective drives 505–508 into memory 500, and executed by a processor 510. The process steps and functionality disclosed hereinabove for performing the method may find specific implementations in a variety of forms, which are considered to be within the abilities of a programmer of ordinary skill in the art after having reviewed the specification.

The foregoing description of the invention illustrates and describes the present invention. Additionally, the disclosure shows and describes only the preferred embodiments of the invention, but it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method comprising:
   providing a comprehensive set of bus transactions characterizing a bus architecture;
   creating a configuration file specific to a DUT from said comprehensive set;
   generating parameterized bus transactions from said configuration file;
   providing a user interface which presents a user with possible transaction types for said bus architecture;
   entering inputs corresponding to a specific DUT via said interface; and
   processing said inputs to generate said configuration file wherein said processing comprises rules corresponding to said inputs in said configuration file to select bus transactions specific to said DUT.

2. A computer-usable medium storing computer-executable instructions which when executed implement a process comprising:
   applying selected parameters for verifying a DUT to a table including a set of transactions characterizing a bus architecture;
   modifying entries in said table in accordance with said parameters;
   generating a configuration file for verifying said DUT from said modified entries; and
   generating rules from said modified entries for selecting bus transactions specific to said DUT.

3. A system comprising:
   a memory including computer-executable instructions;
   a processor coupled to said memory for executing said instructions; and
   a table including transactions characterizing a bus architecture;
   wherein said instructions support a user interface for entering inputs to generate a specific DUT configuration file from said table, said configuration file including parameters and rules for verifying said DUT and process entries in said table modified by said inputs to generate a syntax for said configuration file.

4. The system of claim 3, wherein said instructions parse said syntax to generate a test case for verifying said DUT.

5. A method comprising:
   providing a table having entries corresponding to a set of transactions of a bus architecture;
   applying inputs corresponding to a specific DUT to said table;
   modifying said entries using inputs;
   generating a configuration file for verifying said DUT from said modified entries;
   providing a user interface which presents a user with possible transaction types for said bus architecture;
   entering inputs corresponding to a specific DUT via said interface; and
   processing said inputs to generate said configuration file.

* * * * *